United States Patent
Higai et al.

(10) Patent No.: US 12,358,563 B2
(45) Date of Patent: **\*Jul. 15, 2025**

(54) AUTOMOTIVE CRASHWORTHINESS ENERGY ABSORPTIVE PART

(71) Applicant: JFE STEEL CORPORATION, Tokyo (JP)

(72) Inventors: Kazuhiko Higai, Tokyo (JP); Tsuyoshi Shiozaki, Tokyo (JP); Yoshikiyo Tamai, Tokyo (JP); Shigeaki Kitamura, Aichi (JP); Naoki Mabuchi, Aichi (JP)

(73) Assignee: JFE STEEL CORPORATION, Tokyo (JP)

( * ) Notice: Subject to any disclaimer, the term of this patent is extended or adjusted under 35 U.S.C. 154(b) by 371 days.

This patent is subject to a terminal disclaimer.

(21) Appl. No.: 18/009,583

(22) PCT Filed: Mar. 19, 2021

(86) PCT No.: PCT/JP2021/011352
§ 371 (c)(1),
(2) Date: Dec. 9, 2022

(87) PCT Pub. No.: WO2021/256035
PCT Pub. Date: Dec. 23, 2021

(65) Prior Publication Data
US 2023/0219623 A1    Jul. 13, 2023

(30) Foreign Application Priority Data
Jun. 17, 2020 (JP) ................................ 2020-104467

(51) Int. Cl.
*B62D 25/04* (2006.01)
*B62D 21/15* (2006.01)
(Continued)

(52) U.S. Cl.
CPC ............. *B62D 25/04* (2013.01); *B62D 21/15* (2013.01); *B62D 25/00* (2013.01); *B62D 25/08* (2013.01); *B62D 29/004* (2013.01); *B62D 29/007* (2013.01)

(58) Field of Classification Search
CPC ........ B62D 25/00; B62D 25/04; B62D 25/08; B62D 25/025; B62D 29/001;
(Continued)

(56) References Cited

U.S. PATENT DOCUMENTS 5,575,526 A    11/1996   Wycech
6,468,613 B1   10/2002   Kitano et al.
(Continued)

FOREIGN PATENT DOCUMENTS

EP    1331161 A1 *  7/2003    ............. B62D 21/15
JP    2000-318075 A   11/2000
(Continued)

OTHER PUBLICATIONS

EP1331161 Text (Year: 2003).*
(Continued)

*Primary Examiner* — Dennis H Pedder
(74) *Attorney, Agent, or Firm* — Oliff PLC

(57) ABSTRACT

An automotive crashworthiness energy absorptive part absorbs crashworthiness energy by crushing axially when a crashworthiness load is input from a front side or a rear side of an automotive body, and includes: a tubular member formed of a steel sheet with a tensile strength of 590 MPa to 1180 MPa, the tubular member including a top portion and a pair of side wall portions continuous from both ends of the top portion via corner portions; a closed cross section space forming wall member formed of a steel sheet with a tensile strength lower than the tubular member, the closed cross section space forming wall member being disposed on an
(Continued)

inner surface side of the tubular member and forming a closed cross section space between the closed cross section space forming wall member and at least the corner portion; and a resin provided in the closed cross section space.

10 Claims, 9 Drawing Sheets

(51) Int. Cl.
  *B62D 25/00* (2006.01)
  *B62D 25/08* (2006.01)
  *B62D 29/00* (2006.01)

(58) Field of Classification Search
  CPC .. B62D 29/005; B62D 29/007; B62D 29/041; B62D 29/043; B60R 19/24; B60R 19/34
  USPC ............. 296/193.09, 209, 205, 204; 293/133
  See application file for complete search history.

(56) References Cited

U.S. PATENT DOCUMENTS

| | | | |
|---|---|---|---|
| 6,821,638 | B2 | 11/2004 | Obeshaw |
| 11,279,408 | B2 * | 3/2022 | Hirose ................. B62D 29/002 |
| 11,975,762 | B2 * | 5/2024 | Higai ................... B62D 29/002 |
| 2002/0033618 | A1 | 3/2002 | Kwon |
| 2006/0142403 | A1 | 6/2006 | Sugiura et al. |
| 2006/0152041 | A1 | 7/2006 | Igarashi et al. |
| 2010/0028651 | A1 | 2/2010 | Golden et al. |
| 2012/0315414 | A1 | 12/2012 | Wesch et al. |
| 2018/0029645 | A1 | 2/2018 | Von Watzdorf et al. |
| 2019/0323574 | A1 * | 10/2019 | Suzuki .................. B29C 70/023 |
| 2022/0081033 | A1 | 3/2022 | Higai et al. |

FOREIGN PATENT DOCUMENTS

| | | |
|---|---|---|
| JP | 2006-240134 A | 9/2006 |
| JP | 2011-529817 A | 12/2011 |
| JP | 2017-159894 A | 9/2017 |
| JP | 2018-047714 A | 3/2018 |
| JP | 2018-144529 A | 9/2018 |
| JP | 2019-158028 A | 9/2019 |
| WO | 99/10168 A1 | 3/1999 |
| WO | 2004/108807 A1 | 12/2004 |
| WO | 2020/170569 A1 | 8/2020 |

OTHER PUBLICATIONS

Jun. 8, 2021 International Search Report issued in Patent Application No. PCT/JP2021/011352.
Jun. 20, 2024 Office Action issued in Korean Patent Application No. 10-2022-7043146.
Oct. 10, 2023 extended Search Report issued in European Patent Application No. 21824756.7.
Mar. 3, 2020 Search Report issued in International Patent Application No. PCT/JP2019/048694.
Nov. 15, 2023 U.S. Office Action issued U.S. Appl. No. 17/429,101.
Effect of Various Additives on the Physical Properties of Polyvinylchloride Resin; retrieved via google search on Nov. 8, 2023. (Year: 2010).
Mar. 5, 2024 Notice of Allowance issued in U.S. Appl. No. 17/429,101.

* cited by examiner (a)  (b)

(a)

(b)

(c)

(d)

(a)　　　　　　　　　　　(b)

(a)

(b)

(c)

(d)

AUTOMOTIVE CRASHWORTHINESS ENERGY ABSORPTIVE PART

FIELD

The present invention relates to an automotive crashworthiness energy absorptive part, and more particularly to an automotive crashworthiness energy absorptive part that absorbs crashworthiness energy by crushing axially in a longitudinal direction when a crashworthiness load is input from the front or the rear of an automotive body.

BACKGROUND

As a technique for improving crashworthiness energy absorptive properties of an automobile, there are many techniques such as optimization of a shape, a structure, a material, and the like of automotive parts. Furthermore, in recent years, many techniques have been proposed in which an automotive part having a closed cross section shape is filled with a resin (for example, a foamed resin) to achieve both improvement in crashworthiness energy absorptive properties of the automotive part and weight reduction of the automotive body.

For example, Patent Literature 1 discloses a technique in which a structural part configured to form a closed space inside by aligning the directions of the top portions and overlapping the flanges of hat-shaped cross section parts such as a side sill, a floor member, and a pillar with each other is filled with a foaming filler to improve the bending strength and torsional stiffness of the structural part with a minimum weight increase, and thereby to improve the rigidity and collision safety of the automotive body.

In addition, Patent Literature 2 discloses a technique in which, when an internal space of a structure with a closed cross section such as a pillar formed by opposing hat-shaped cross section parts to each other and joining the flange portions is filled with a foamed body with high rigidity, the foamed body is fixed by action of the compressive counterforce due to filling and foaming of the foamed body with high rigidity to improve the vibration damping performance for suppressing the transmission of vibration sound while improving the strength, rigidity, and impact energy absorptive properties.

CITATION LIST

Patent Literature

Patent Literature 1: JP 2006-240134 A
Patent Literature 2: JP 2000-318075 A

SUMMARY

Technical Problem

According to the techniques disclosed in Patent Literature 1 and Patent Literature 2, by filling the automotive part with the foaming filler or the foamed body, it is possible to improve strength against bending deformation of the automotive part, impact energy absorptive properties against bending deformation due to crash, and furthermore, rigidity against torsional deformation, and thus to suppress the deformation of the automotive part. However, there is a problem that it is difficult to improve the crashworthiness energy absorptive properties by applying the technique in which the automotive part is filled with the foaming filler or the foamed body, in the case of automotive parts that absorb crashworthiness energy by generating buckling deformation in a bellows-shaped manner during axial (longitudinal) crush when a crashworthiness load is input from the front or the rear of the automobile, such as a front side member and a crash box covered by the present invention.

Further, since the conventional automotive parts as described above have low water resistance, there is a problem that the crashworthiness energy absorptive properties are reduced depending on the use environment such as rainy weather or high humidity if they are used for a long period of time.

The present invention has been made in view of the above problems, and an object of the present invention is to provide an automotive crashworthiness energy absorptive part capable of improving the crashworthiness energy absorbing effect while the automotive crashworthiness energy absorptive part axially crushes in a bellows-shaped manner when a crashworthiness load is input from the front or the rear of the automotive body such as the front side member or crash box, and capable of ensuring water resistance and thereby stably maintaining an excellent crashworthiness energy absorbing effect without change even when used for a long period of time in the use environment of an actual vehicle such as rainy weather or high humidity.

Solution to Problem

An automotive crashworthiness energy absorptive part according to a first aspect of the present invention absorbs crashworthiness energy by crushing axially when a crashworthiness load is input from a front side or a rear side of an automotive body, and includes: a tubular member formed of a steel sheet with a tensile strength of 590 MPa to 1180 MPa, the tubular member including a top portion and a pair of side wall portions continuous from both ends of the top portion via corner portions; a closed cross section space forming wall member formed of a steel sheet with a tensile strength lower than that of the tubular member, the closed cross section space forming wall member being disposed on an inner surface side of the tubular member and forming a closed cross section space between the closed cross section space forming wall member and at least the corner portion; and a resin provided in the closed cross section space, wherein the resin contains a rubber-modified epoxy resin and a hardener, and has a tensile breaking elongation of 2% or more and less than 80%, an adhesive strength with the tubular member and the closed cross section space forming wall member of 12 MPa or more, and a compressive nominal stress of 6 MPa or more at a compressive nominal strain of 10%.

An automotive crashworthiness energy absorptive part according to a second aspect of the present invention absorbs crashworthiness energy by crushing axially when a crashworthiness load is input from a front side or a rear side of an automotive body, the automotive crashworthiness energy absorptive part comprising: a tubular member formed of a steel sheet with a tensile strength of 590 MPa to 1180 MPa, the tubular member including a top portion and a pair of side wall portions continuous from both ends of the top portion via corner portions; a closed cross section space forming wall member formed of a steel sheet with a tensile strength lower than that of the tubular member, the closed cross section space forming wall member being disposed on an inner surface side of the tubular member and forming a closed cross section space between the closed cross section space forming wall member and at least the corner portion;

and a resin provided in the closed cross section space, wherein the resin contains a rubber-modified epoxy resin, and has a tensile breaking elongation of 2% or more and less than 80%, an adhesive strength with the tubular member and the closed cross section space forming wall member of 12 MPa or more, and a compressive nominal stress of 6 MPa or more at a compressive nominal strain of 10%.

The closed cross section space forming wall member may be disposed so as to straddle the top portion and the corner portion, and may have both end portions joined to inner surfaces of the pair of side wall portions and a central portion in contact with the inner surface of the top portion.

The central portion of the closed cross section space forming wall member may be joined to the inner surface of the top portion.

The closed cross section space forming wall member may be disposed so as to straddle the corner portion, and may have one end portion joined to the inner surface of the side wall portion continuous from the corner portion and the other end joined to the inner surface of the top portion continuous from the corner portion.

The resin may be provided in at least a corner area in the closed cross section space, and at least one of areas on both sides of the resin in the closed cross section space is a cavity.

Advantageous Effects of Invention

According to the present invention, it is possible to, in a process of compressive deformation of a tubular member that absorbs crashworthiness energy by crushing axially when a crashworthiness load is input from the front or the rear of the automotive body, repeatedly generate buckling deformation in a bellows-shaped manner without reducing the deformation resistance of the tubular member to significantly improve a crashworthiness energy absorbing effect, and to ensure water resistance and thereby to stably maintain an excellent crashworthiness energy absorbing effect without change even when used for a long period of time in the use environment of an actual vehicle such as rainy weather or high humidity.

DESCRIPTION OF EMBODIMENTS

Figure 1:
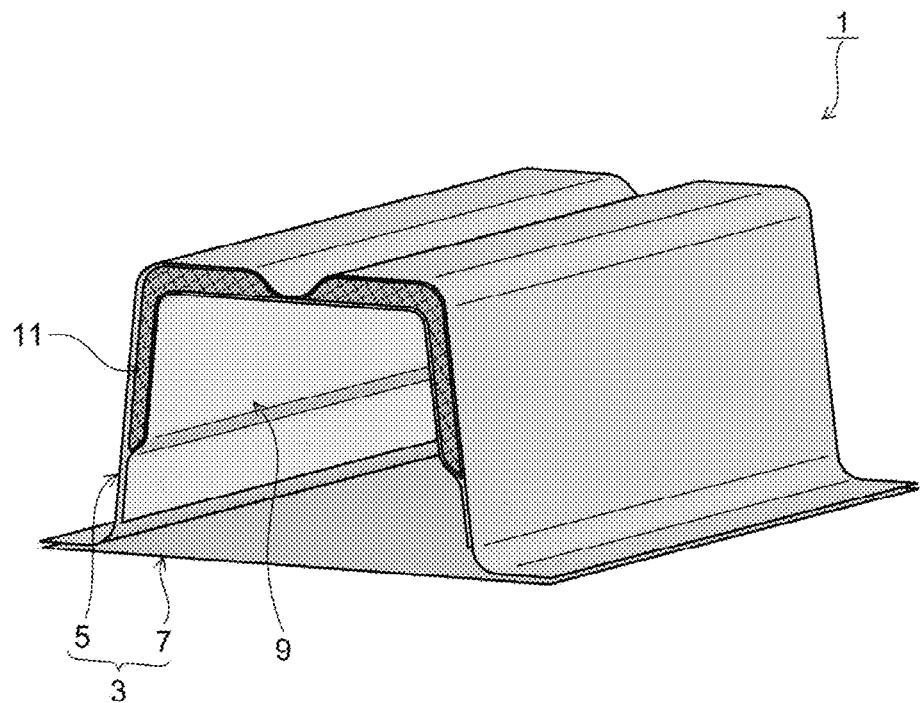
FIG. 1 is an explanatory view for explaining a configuration of an automotive crashworthiness energy absorptive part according to an embodiment of the present invention.

An automotive crashworthiness energy absorptive part according to an embodiment of the present invention will be described below with reference to FIGS. 1 to 8. Note that, in the description and the drawings, elements having substantially the same function and configuration are denoted by the same reference numerals to omit redundant description.

Figure 2:
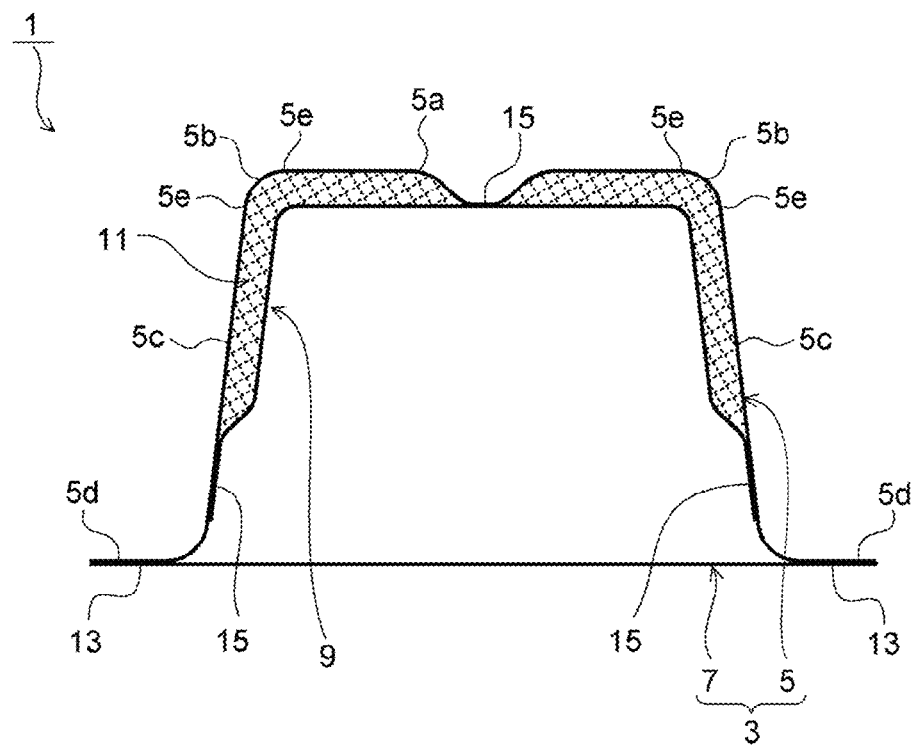
FIG. 2 is a cross-sectional view of the automotive crashworthiness energy absorptive part according to the present embodiment.
Figure 3:
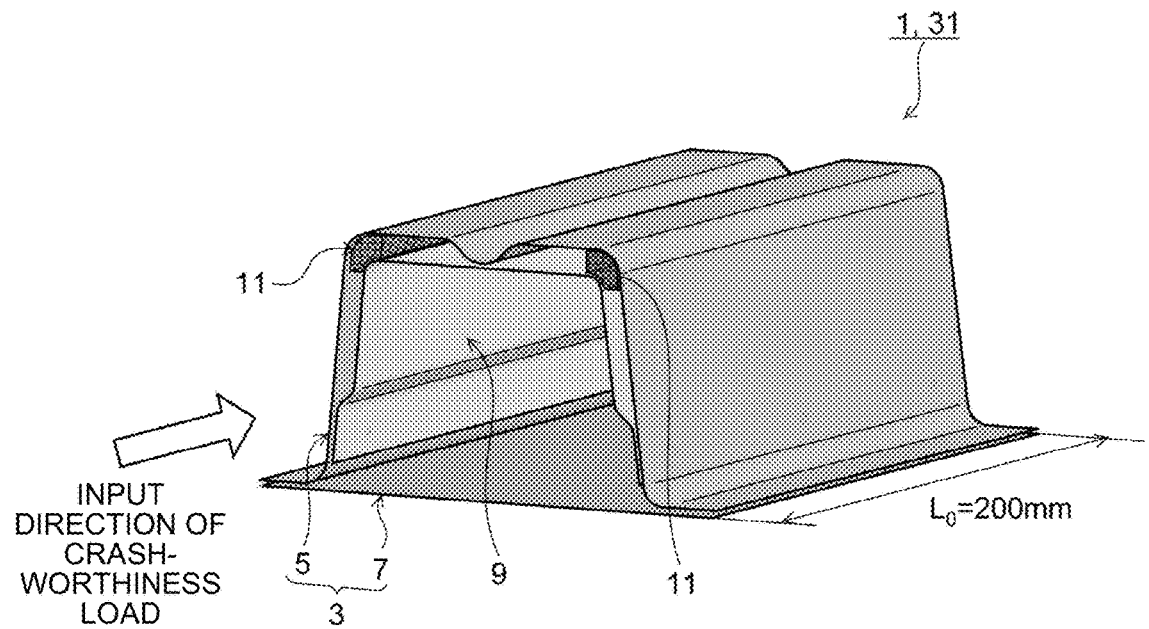
FIG. 3 is a view for explaining a crashworthiness load input to the automotive crashworthiness energy absorptive part in the present embodiment and examples.

An automotive crashworthiness energy absorptive part 1 according to the present embodiment absorbs crashworthiness energy by crushing axially when a crashworthiness load is input from the front or the rear of an automotive body, and includes a tubular member 3, a closed cross section space forming wall member 9, and a resin 11, as illustrated in FIGS. 1 to 3.

<Tubular Member>

The tubular member 3 is tubularly formed by joining a flange portion 5d of an outer part 5 with a hat-shaped cross section having a top portion 5a, a pair of side wall portions 5c continuous from both ends of the top portion 5a via a corner portion 5b, and the flange portion 5d continuous from the side wall portion 5c, and both ends of a flat sheet-shaped inner part 7 at a join portion 13. Here, the corner portion 5b is a bent portion connecting the top portion 5a and the side wall portion 5c, and is a portion between a boundary 5e between a curve and a straight line on the top portion 5a side and a boundary 5e between a curve and a straight line on the side wall portion 5c side (see FIG. 2). The same applies to the following description.

The outer part 5 and the inner part 7 constituting the tubular member 3 are both formed of a steel sheet with a tensile strength of 590 MPa to 1180 MPa. Here, examples of the type of the steel sheet include a cold rolled steel sheet, a hot rolled steel sheet, a zinc-based coating steel sheet, a zinc alloy coating steel sheet, and an aluminum alloy coating steel sheet.

The tubular member 3 is used for automotive parts having a closed cross-sectional structure, such as a front side member extending in the front-rear direction of the automotive body at left and right positions of the front portion of the automotive body and constituting a part of an automotive body frame, and a crash box provided at the front end or rear end of the automotive body frame. Such automotive parts are disposed on the automotive body such that the axial direction (longitudinal direction) of the tubular member 3 coincides with the front-rear direction of the automotive body. With this configuration, the tubular member 3 absorbs crashworthiness energy by crushing axially when a crashworthiness load is input from the front or the rear of the automotive body.

<Closed Cross Section Space Forming Wall Member>

The closed cross section space forming wall member 9 is formed of a steel sheet with a lower tensile strength than the tubular member 3 (for example, 270 MPa class, 440 MPa class, etc.). As illustrated in FIG. 2, the closed cross section space forming wall member 9 is disposed on the inner surface side of the tubular member 3, and forms a closed cross section space between the closed cross section space forming wall member 9 and at least the corner portion 5b, including a case where the closed cross section space forming wall member 9 is joined to, brought into contact with, or divided at the vicinity of the center of the top portion 5a.

In the automotive crashworthiness energy absorptive part 1, as illustrated in FIG. 2, the closed cross section space forming wall member 9 is a member having a substantially U-shaped cross section disposed so as to include the corner portion 5b and straddle the corner portion 5b between the outer part 5 and the inner part 7. Both end portions of the closed cross section space forming wall member 9 are joined to the pair of side wall portions 5c of the outer part 5, and a closed cross section space is formed between the closed cross section space forming wall member 9 and the inner surfaces of the top portion 5a, the corner portion 5b, and a part of the side wall portion 5c of the outer part 5 of the tubular member 3.

The closed cross section space formed between the closed cross section space forming wall member 9 and the outer part 5 refers to a space in which a cross-sectional shape in a direction intersecting the axial direction of the tubular member 3 illustrated in FIG. 1 is a closed cross section, and the closed cross section is continuously formed along the axial direction of the tubular member 3. Both end portions of the closed cross section space forming wall member 9 and the inner surface of the side wall portion 5c or the inner surface of the top portion 5a are joined by spot welding or the like, for example.

<Resin>

The resin 11 is provided over the entire length of the closed cross section space in the axial direction formed between the closed cross section space forming wall member 9 and the outer part 5. The resin 11 may be provided in a part of the closed cross section space in the axial direction, for example, in a part of the side to which a crashworthiness load is input.

The resin 11 contains a rubber-modified epoxy resin and a hardener, and undergoes a heat treatment at a predetermined temperature and for a predetermined time so that the resin can be adhered to the outer part 5 and the closed cross section space forming wall member 9 due to the adhesive capacity of the resin 11 itself. Further, the resin 11 has the following physical properties: the tensile breaking elongation is 2% or more and less than 80%, the adhesive strength with the tubular member 3 and the closed cross section space forming wall member 9 is 12 MPa or more, and the compressive nominal stress at a compressive nominal strain of 10% is 6 MPa or more. Each of these physical properties is a value of a heat-treated resin 11.

The reason why the resin 11 contains the rubber-modified epoxy resin and the hardener is that, when the tubular member 3 crushes and deforms axially in a bellows-shaped manner when a crashworthiness load is input to the tubular member 3, the resin 11 can deform so as to follow the deformation of the tubular member 3 by being adhered to the tubular member 3 and the closed cross section space forming wall member 9 with an adhesive strength of 12 MPa or more after the resin 11 is thermally cured by the heat treatment.

Further, the method for determining the physical properties of the resin 11 (tensile breaking elongation, adhesive strength, and compressive nominal stress) and the reason why each physical property is defined as described above are as follows:

<<Tensile Breaking Elongation>>

An uncured resin is placed between two steel sheets adjusted to have a predetermined gap, and thermally cured under predetermined conditions, the steel sheets are peeled off to prepare a flat sheet-like resin, and the flat sheet-like resin is processed into a predetermined shape to prepare a test piece. Next, a tensile test is performed at a predetermined tensile speed until the resin fractures to measure the inter-marker elongation at resin fracture. Then, a value obtained by dividing the measured inter-marker elongation at resin fracture by the initial inter-marker distance and expressing the result as a percentage is defined as the tensile breaking elongation.

Since the automotive body is usually exposed to rain, splashing rain water, and a high-humidity environment, a resin constituting a part of the automotive body is also required to have water resistance. For this reason, it is necessary to maintain water resistance that can ensure adhesive properties (adhesive strength) for preventing interfacial peeling of the resin of the automotive crashworthiness energy absorptive part 1 for a long period of time. Therefore, in the automotive crashworthiness energy absorptive part 1, since the tensile breaking elongation is 2% or more and less than 80%, the adhesion between the resin 11 and the tubular member 3 or the closed cross section space forming wall member 9 is not reduced even in the use environment such as rainy weather or high humidity, making it possible to ensure water resistance capable of maintaining the crashworthiness energy absorbing effect.

If the tensile breaking elongation is less than 2%, the resin 11 is likely to be cracked or fractured in the process of the axial crush of the tubular member 3 and peeled off from the tubular member 3 or the closed cross section space forming wall member 9, and as a result, the buckling strength and the deformation resistance are likely to be reduced.

On the other hand, if the tensile breaking elongation is 80% or more, the water resistance of the resin 11 cannot be maintained, causing the resin 11 to be peeled off from the tubular member 3 or the closed cross section space forming wall member 9 in the process of the axial crush of the tubular member 3, and as a result, the buckling resistance and the crash worthiness are likely to be reduced.

The index representing the water resistance of the resin includes a characteristic that the resin is unlikely to be peeled off from a steel surface (steel interface) even in the use environment such as rainy weather or high humidity, and a characteristic that the resin is unlikely to swell and fracture. These characteristics of the resin can be obtained, for example, by performing a water resistance evaluation test in which a test piece obtained by overlapping and adhering two steel sheets is immersed in warm water at a predetermined temperature for a predetermined time, then a tensile load is applied until the adhesive surface of the test piece fractures, and the state of the resin on the fractured adhesive surface is obtained.

Figure 4:
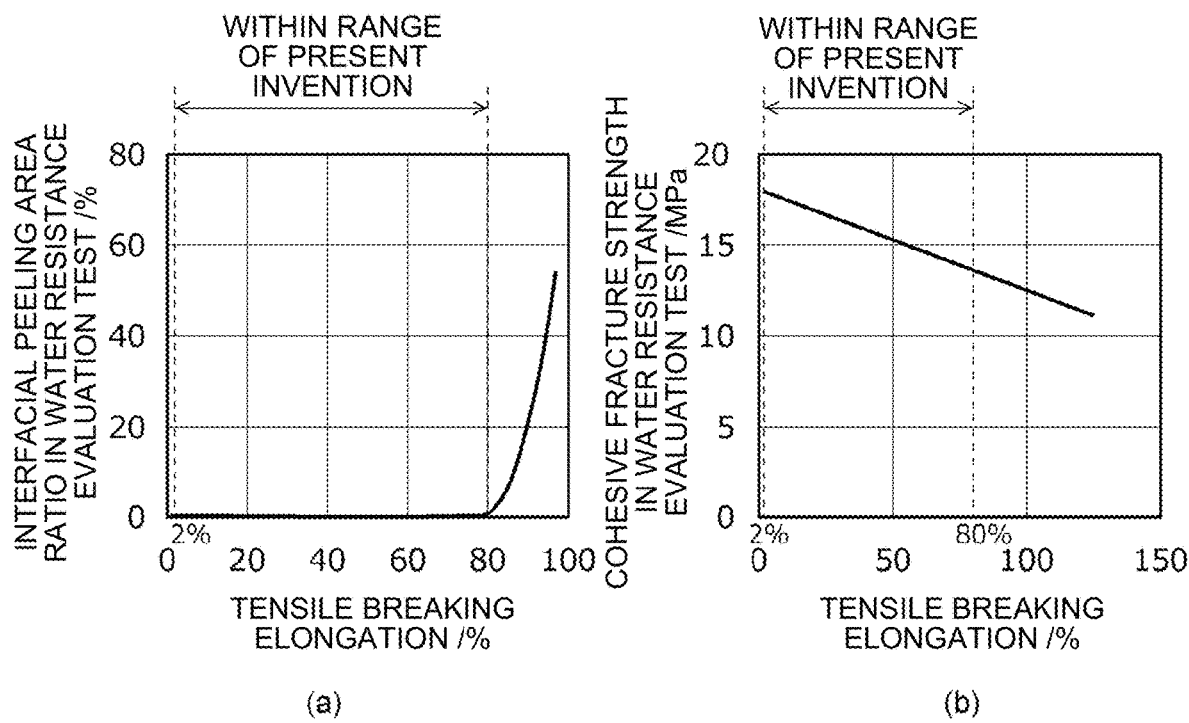
FIG. 4 is a diagram illustrating characteristics related to water resistance of a resin used in the automotive crashworthiness energy absorptive part according to the present embodiment ((a) interfacial peeling and (b) cohesive fracture strength).

FIG. 4 illustrates an example of the characteristics of the resin obtained from the above-described water resistance evaluation test. FIG. 4(a) is a graph illustrating the relationship between the resin interfacial peeling area ratio (=(the area of the adhesive surface from which the resin was peeled off at fracture)/(the area of the adhesive surface of the test piece)×100), which is the ratio of the area of the resin peeled off from the adhesive surface, and the tensile breaking elongation in the water resistance evaluation test. On the other hand, FIG. 4(b) is a graph illustrating the relationship between the cohesive fracture strength when the resin fractures from inside (cohesive fracture) and the tensile breaking elongation of the resin in the above-described water resistance evaluation test.

In the present invention, since the crash worthiness is reduced when the resin 11 is peeled off from the tubular member 3 or the closed cross section space forming wall member 9 made of a steel sheet, a characteristic that the resin is unlikely to be peeled off from the steel surface (steel interface) is important as water resistance. As illustrated in FIG. 4(a), interfacial peeling of the resin correlates with the tensile breaking elongation, and the interfacial peeling of the resin occurred and the water resistance was reduced when the tensile breaking elongation was 80% or more. Therefore, adhesion between the resin 11 and the tubular member 3 or the closed cross section space forming wall member 9 is reduced in the use environment such as rainy weather or high humidity, and the resin 11 is peeled off in the process of the axial crushing deformation of the tubular member 3 and as a result, the buckling resistance and the deformation resistance are likely to be reduced.

In addition, regarding the characteristic that the resin is less likely to swell and is less likely to fracture as well, as illustrated in FIG. 4(b), it is indicated that the interfacial peeling of the resin does not occur (resin interfacial peeling area ratio: 0%) even in the use environment such as rainy weather or high humidity, and the cohesive fracture strength can also be maintained at a sufficiently high value (12 MPa or more) if the tensile breaking elongation of the resin is less than 80%.

<<Adhesive Strength>>

An uncured resin is placed between two steel sheets adjusted to have a predetermined gap, and thermally cured under predetermined conditions to prepare a test piece. Next, a tensile test is performed on the test piece at a predetermined tensile speed, and the load when the steel sheet and the resin fracture is measured. Then, a value obtained by dividing the measured load at fracture by the adhesive area between the steel sheet and the resin (=adhesion shear strength) is defined as the adhesive strength.

When the obtained adhesive strength is 12 MPa or more, it is possible to prevent the resin 11 from being peeled off from the tubular member 3 or the closed cross section space forming wall member 9 in the process of the axial crush of the tubular member 3, and thus to prevent the buckling resistance and the deformation resistance from being reduced.

<<Compressive Nominal Stress>>

An uncured resin is placed between two steel sheets adjusted to have a predetermined gap, and thermally cured under predetermined conditions, and then the steel sheets are peeled off to prepare a flat sheet-like resin. Next, the flat sheet-like resin is cut into a cylindrical shape to prepare a test piece. Then, using the circular surface of the test piece as a compression surface, a value obtained by dividing a load when the test piece is compressed to a nominal strain of 10% at a predetermined test speed by the cross-sectional area of the initial test piece is defined as the compressive nominal stress.

When the compressive nominal stress at the compression nominal strain of 10% obtained as described above is 6 MPa or more, it is possible to have sufficient buckling strength such that the resin 11 itself is not crushed and destroyed even if the tubular member 3 is deformed in a bellows-shaped manner in the axial crush process.

The types and compositions of the rubber-modified epoxy resin and the hardener, and the temperature and time for the heat treatment may be appropriately adjusted so that the tensile breaking elongation, adhesive strength, and compressive nominal stress of the resin 11 fall within the above ranges.

In addition, the hardener may be optimally selected depending on the use environment, reaction temperature, and the like, from among a polyamine (aliphatic polyamine, aromatic amine, aromatic polyamine, and polyamidoamine), an anhydride, a phenolic, a thiol, a dicyandiamide serving as a thermal latent hardener, imidazole compounds, a ketimine, an organic acid hydrazide, and the like.

As described above, in the automotive crashworthiness energy absorptive part 1 according to the present embodiment, in the process of axial crush when a crashworthiness load is input to the tubular member 3, the resin 11 improves the buckling strength without being peeled off from the tubular member 3 or the closed cross section space forming wall member 9, and allows the tubular member 3 to repeatedly generate buckling in a bellows-shaped manner without reducing the deformation resistance of the tubular member 3, thus making it possible to improve the absorbability of the crashworthiness energy. Furthermore, the automotive crashworthiness energy absorptive part 1 can maintain water resistance that does not reduce the adhesion of the resin 11 even in the use environment such as rainy weather or high humidity, and that can ensure an excellent crashworthiness energy absorption effect for a long period of time.

In the above description, the resin 11 contains the rubber-modified epoxy resin and the hardener after the heat treatment. However, the hardener may not remain or not be detected in the resin 11 that has been heat-treated at a predetermined temperature for a predetermined time, depending on the amount of the hardener.

Therefore, as another aspect of the automotive crashworthiness energy absorptive part 1 according to the embodiment of the present invention, the hardener may not be contained or not be detected in the heat-treated resin 11, and the resin 11 may be adhered to the outer part 5 and the closed cross section space forming wall member 9 due to the adhesive capacity of the resin 11 itself when the resin 11 is heat-treated at a predetermined temperature and for a predetermined time.

Even when the hardener is not contained or not detected in the heat-treated resin 11, the resin 11 has, as its physical properties, a tensile breaking elongation of 2% or more and less than 80%, an adhesive strength with the tubular member 3 and the closed cross section space forming wall member 9 of 12 MPa or more, and a compressive nominal stress at a compressive nominal strain of 10% of 6 MPa or more. The types and compositions of the rubber-modified epoxy resin and the hardener that are provided in the closed cross section space before the heat treatment, and the temperature and time for the heat treatment may be appropriately adjusted so that the tensile breaking elongation, adhesive strength, and compressive nominal stress of the resin 11 fall within the above ranges.

When the resin 11 that contains the rubber-modified epoxy resin and in which the hardener is not contained or not detected has the physical properties that fall within the above ranges, it is possible to maintain water resistance that can ensure the adhesion of the resin 11, without reducing it, for a long period of time even in the use environment such as rainy weather or high humidity. In the process of the axial crush of the tubular member 3, the resin 11 improves the buckling strength without being peeled off from the tubular member 3 or the closed cross section space forming wall member 9, and allows the tubular member 3 to repeatedly generate buckling in a bellows-shaped manner without reducing the deformation resistance of the tubular member 3, thus making it possible to improve the absorbability of the crashworthiness energy.

In addition, in the automotive crashworthiness energy absorptive part 1 according to the present embodiment, an example has been described in which the closed cross section space forming wall member 9 and the side wall portion 5c of the outer part 5 are joined by a join portion 15, and the resin 11 is provided between the closed cross section space forming wall member 9 and the top portion 5a, the corner portion 5b, or a part of the side wall portion 5c, as illustrated in the cross section in FIG. 2, but the present invention is not limited thereto.

Figure 5:
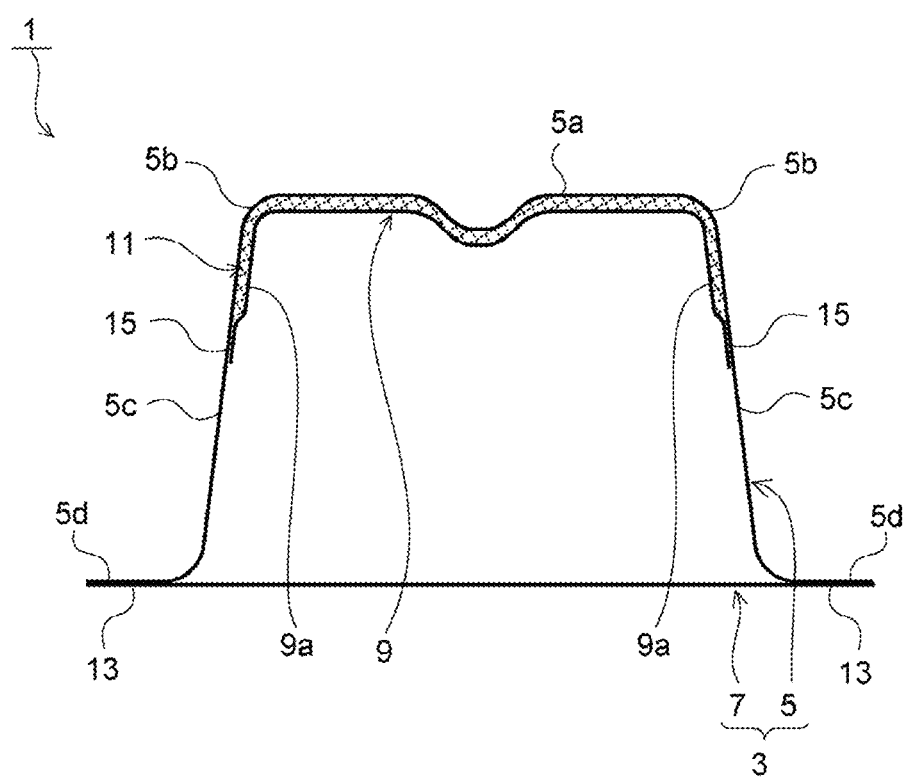
FIG. 5 is a cross-sectional view illustrating a specific example of a closed cross section space forming wall member used in the automotive crashworthiness energy absorptive part according to the present embodiment (part 1).

For example, as illustrated in FIG. 5, the side wall portion 9a of the closed cross section space forming wall member 9 may be merely ½ or less of the side wall height, and the resin 11 may be provided in the closed cross section space formed between the closed cross section space forming wall member 9 and the inner surface mainly of the top portion 5a and the corner portion 5b of the outer part 5.

Figure 6:
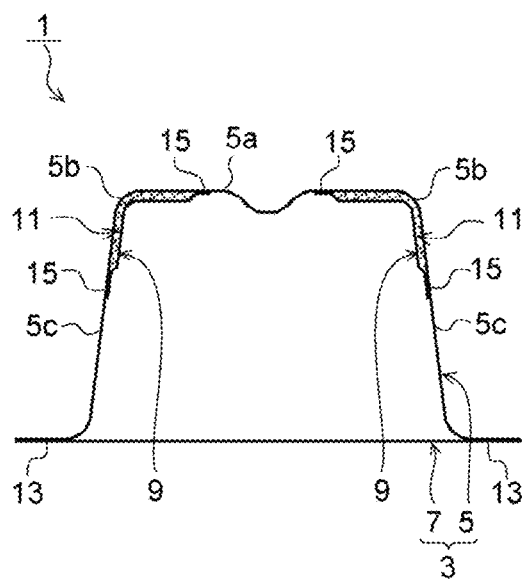
FIG. 6 is a cross-sectional view illustrating a specific example of the closed cross section space forming wall member used in the automotive crashworthiness energy absorptive part according to the present embodiment (part 2).
Figure 6:
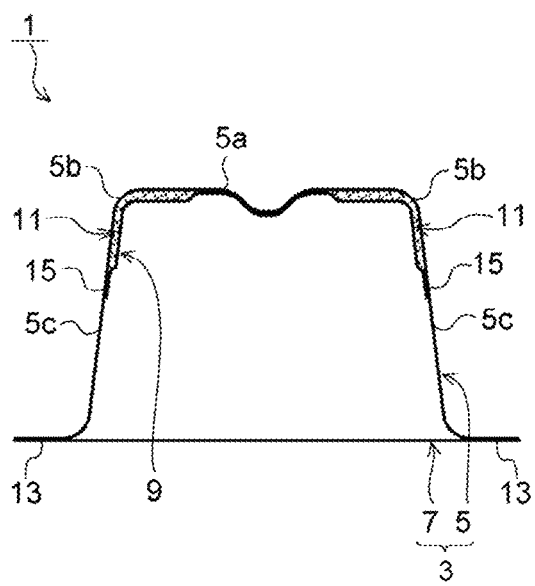
Figure 6:
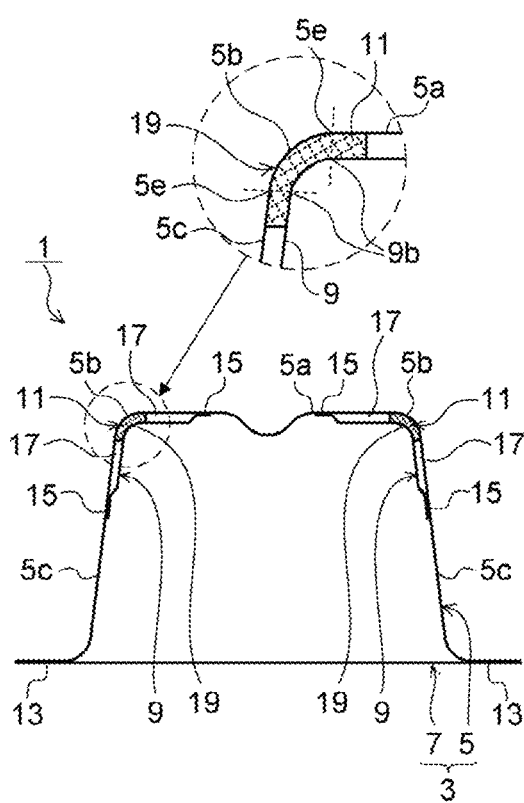
Figure 6:
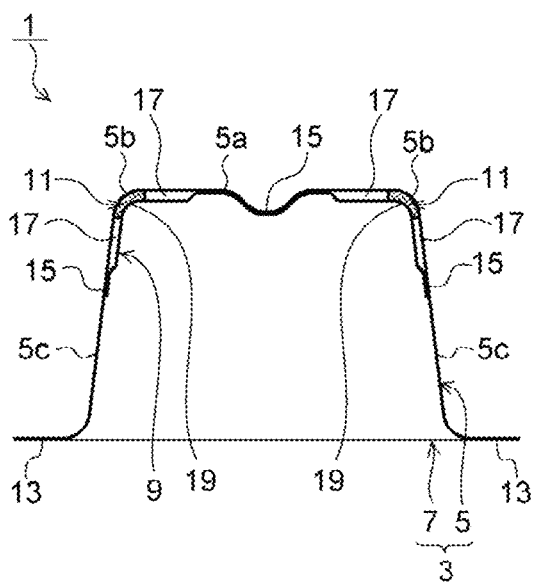

Further, the crashworthiness energy absorbing effect can be expected to be improved if a closed cross section space is formed between the closed cross section space forming wall member 9 and the inner surface of the corner portion 5b where cracking is particularly likely to occur at crash, and the resin 11 is provided in such a closed cross section space. Therefore, as illustrated in FIG. 6, the resin 11 may be provided in the closed cross section space formed between the closed cross section space forming wall member 9 and the corner portion 5b.

In this case, two closed cross section space forming wall members 9 may be disposed so as to straddle the respective corner portions 5b on both sides of the top portion 5a, and each closed cross section space forming wall member 9 may have one end side joined to the inner surface of the side wall portion 5c continuous from the corner portion 5b by the join portion 15 and the other end side joined to the inner surface of the top portion 5a continuous from the corner portion 5b by the join portion 15 (FIG. 6(a)). Alternatively, one closed cross section space forming wall member 9 may be disposed so as to straddle the top portion 5a and the two corner portions 5b, and have both end portions joined to the inner surfaces of the pair of side wall portions 5c by the join portions 15, and the central portion in contact with the inner surface of the top portion 5a (FIG. 6(b)). The central portion may be joined to the inner surface of the top portion 5a. With these configurations, the closed cross section space forming wall member 9 forming the closed cross section space between the closed cross section space forming wall member 9 and the top portion 5a can be small, and thus the weight of the automotive body can also be reduced.

The closed cross section space between the outer part 5 and the closed cross section space forming wall member 9 does not need to be filled with the resin 11, and as illustrated in FIGS. 6(c) and 6(d), the resin 11 may be provided in at least a corner area 19 in the closed cross section space, and at least one area of areas on both sides of the resin 11 in the closed cross section space may be a cavity 17.

Here, in the closed cross section space formed between the outer part 5 with a hat-shaped cross section and the closed cross section space forming wall member 9 with a hat-shaped cross section, for example, as illustrated in FIGS. 6(c) and 6(d), the corner area 19 in the closed cross section space refers to an area partitioned by straight lines connecting boundaries 5e between the curve and the straight line of the outer part 5 and boundaries 9b between the curve and the straight line of the closed cross section space forming wall member 9 as illustrated in a partially enlarged view (a portion surrounded by a broken line circle) of FIG. 6(c).

When the resin 11 is provided in at least the corner area 19 in the closed cross section space area, the resin 11 may be provided in the corner area 19 as illustrated in FIGS. 6(c) and 6(d), and the end portion of the resin 11 may extend to the top portion 5a side or the side wall portion 5c side in the closed cross section space. For example, there may be the cavity 17 between the resins 11 placed in the left and right corner areas 19, and the left and right resins 11 may be separated by the cavity 17.

Further, the cavity 17 refers to an area where the resin 11 is not provided between the outer part 5 and the closed cross section space forming wall member 9 in the closed cross section space, and where the resin 11 is not in contact with the outer part 5 or the closed cross section space forming wall member 9.

As described above, in the automotive crashworthiness energy absorptive part 1 illustrated in FIGS. 6(a) to 6(d), it is possible to significantly improve the crash worthiness while reducing the weight of the automotive crashworthiness energy absorptive part 1 by limiting the closed cross section space forming wall member 9 and the resin 11 to the minimum size and amount.

Figure 7:
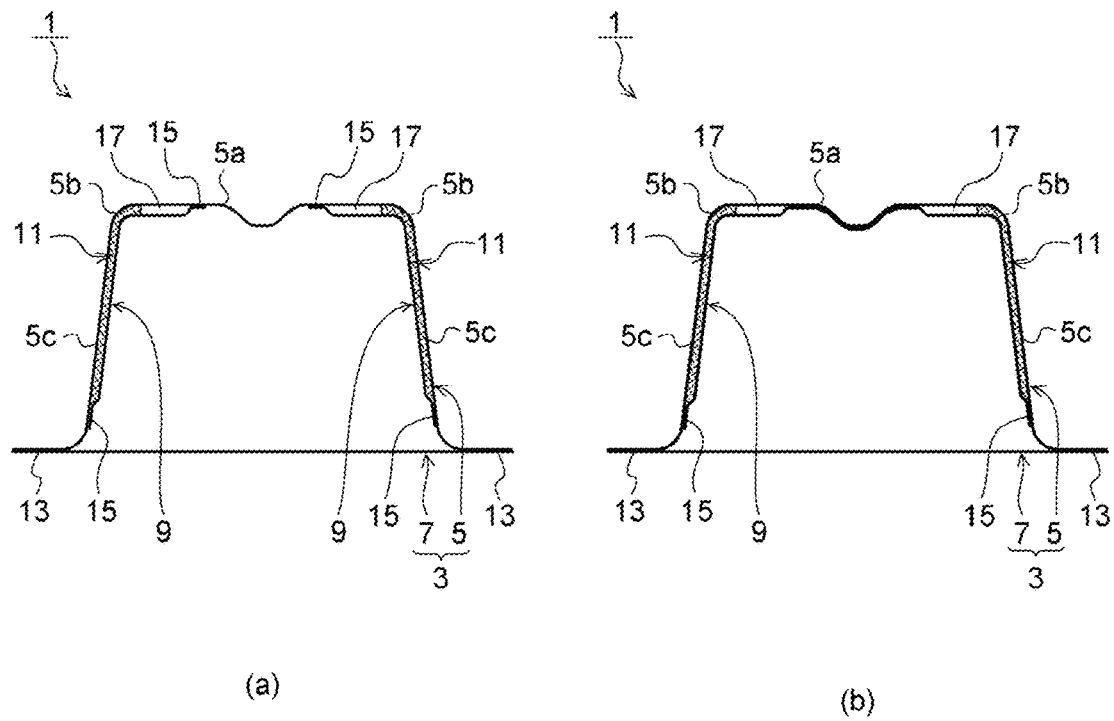
FIG. 7 is a cross-sectional view illustrating a specific example of the closed cross section space forming wall member used in the automotive crashworthiness energy absorptive part according to the present embodiment (part 3).

In addition, as illustrated in FIG. 7, the resin 11 may be provided in the closed cross section space formed between the closed cross section space forming wall member 9 and the inner surfaces of the corner portion 5b and the side wall portion 5c by the closed cross section space forming wall member 9. In this case, as in FIG. 6, two closed cross section space forming wall members 9 may be used and the join portion 15 may be provided in each of the top portion 5a and the side wall portion 5c (FIG. 7(a)), or one closed cross section space forming wall member 9 may be used and the central portion of the closed cross section space forming wall member 9 may be in contact with or joined to the top portion 5a of the outer part 5, and the join portions 15 may be provided in the pair of side wall portions 5c so that a closed cross section space is formed between the closed cross section space forming wall member 9 and the respective corner portions 5b (FIG. 7(b)).

Figure 8:
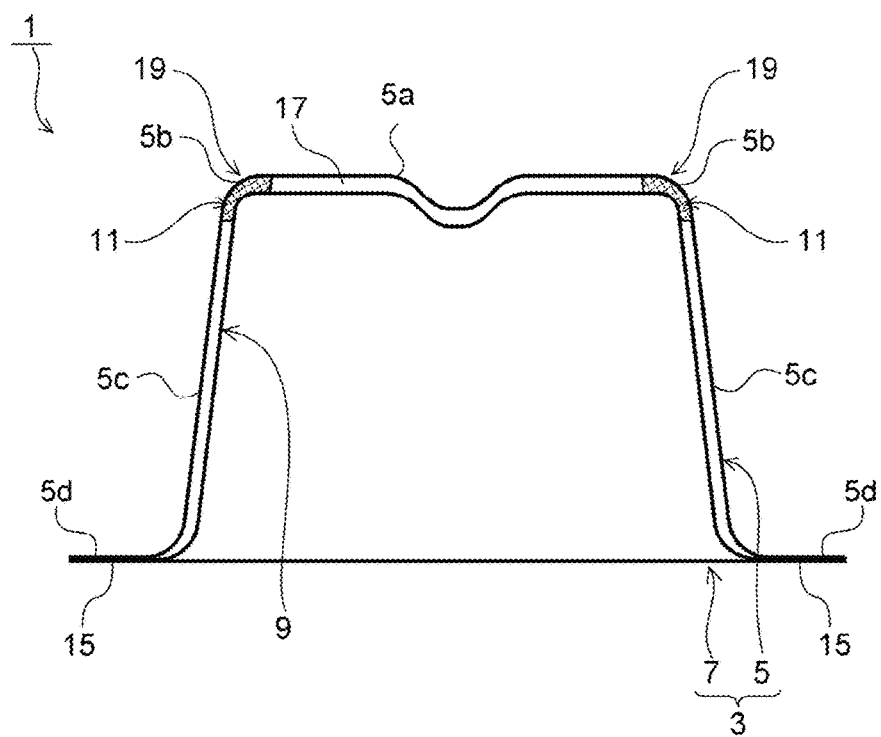
FIG. 8 is a cross-sectional view illustrating a specific example of the closed cross section space forming wall member used in the automotive crashworthiness energy absorptive part according to the present embodiment (part 4).

Further, as illustrated in FIG. 8, both side ends of the closed cross section space forming wall member 9 with a hat-shaped cross section may be joined to the outer part 5 and the inner part 7 at the join portion 15. Also in this case, the closed cross section space formed between the closed cross section space forming wall member 9 and each of the outer part 5 and inner part 7 does not need to be filled with the resin 11. For example, as illustrated in FIG. 8, the resin 11 is placed in at least the corner area 19 in the closed cross section space, and any one of the areas on both sides of the resin 11 in the closed cross section space is used as the cavity 17, thereby also reducing the weight of the automotive body.

Figure 9:
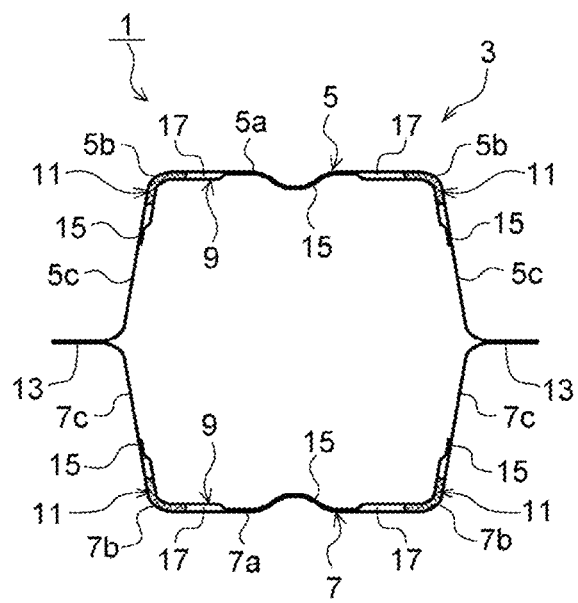
FIG. 9 is a cross-sectional view illustrating a specific embodiment of the automotive crashworthiness energy absorptive part according to the present invention.
Figure 9:
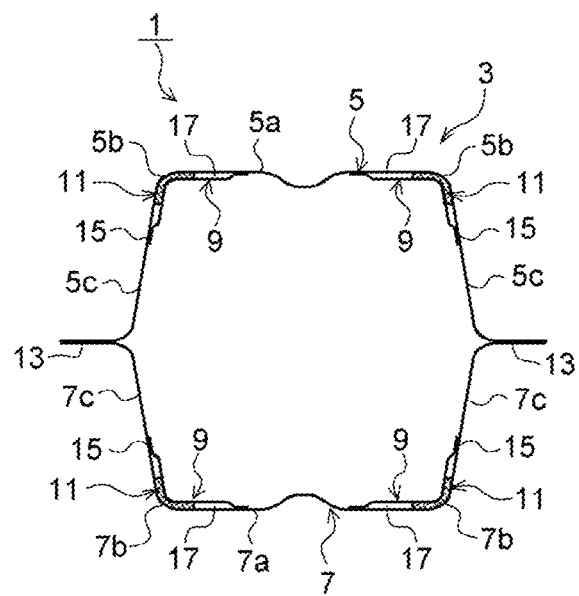
Figure 9:
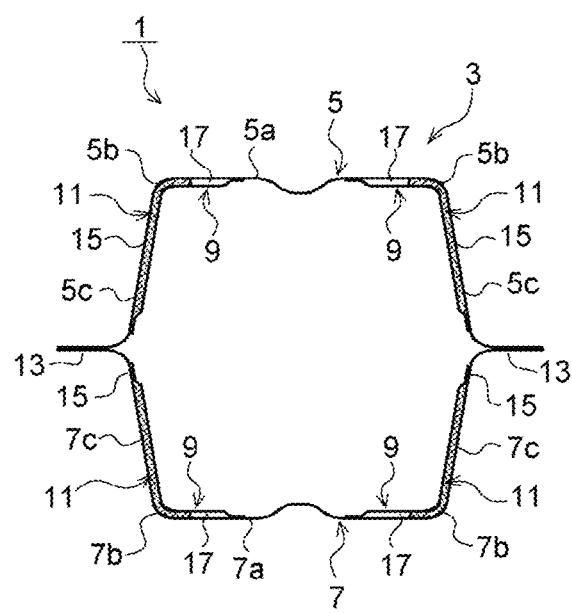
Figure 9:
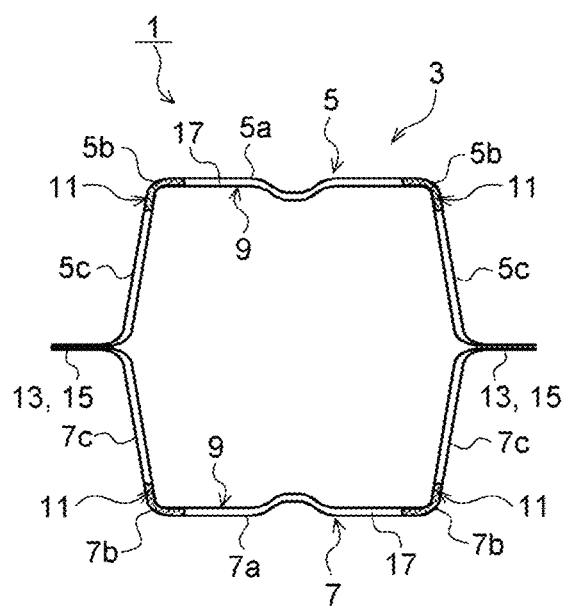

An example has been described in which the automotive crashworthiness energy absorptive part 1 according to the present embodiment includes the tubular member 3 including the outer part 5 with a hat-shaped cross section and the inner part 7 in a flat sheet shape, but the present invention is not limited thereto. As illustrated in FIG. 9, one aspect may provide the tubular member 3 cylindrically formed by opposing the outer part 5 with a hat-shaped cross section and the inner part 7 with a hat-shaped cross section to each other, and joining the flange portions of the outer part 5 and the inner part 7 to each other.

FIG. 9(*a*) illustrates an example in which the closed cross section space forming wall member 9 is disposed and the resin 11 is provided in the aspect illustrated in FIG. 6(*d*). FIG. 9(*b*) illustrates an example in which the closed cross section space forming wall member 9 is disposed and the resin 11 is provided in the aspect illustrated in FIG. 6(*c*). FIG. 9(*c*) illustrates an example in which the closed cross section space forming wall member 9 is disposed and the resin 11 is provided in the aspect illustrated in FIG. 7(*a*). FIG. 9(*d*) illustrates an example in which the closed cross section space forming wall member 9 is disposed and the resin 11 is provided in the aspect illustrated in FIG. 8. In FIG. 9, the outer part 5 is denoted by the same reference numerals as those in FIGS. 5 to 8, and the inner part 7 is denoted by reference numerals corresponding to those of the outer part 5.

Similarly, the aspects illustrated in FIGS. 5, 6(*a*), 6(*b*), and 6(*d*) and the aspect illustrated in FIG. 7(*b*) can also be applied to the tubular member formed by opposing the outer part with a hat-shaped cross section and the inner part with a hat-shaped cross section to each other and joining the flange portions to each other.

Although FIG. 9 illustrates an example in which the outer part 5 and the inner part 7 have the same hat-shaped cross section, the outer part 5 and the inner part 7 may have different hat-shaped cross sections.

EXAMPLES

An experiment for confirming the effect of the automotive crashworthiness energy absorptive part according to the present invention has been conducted, and the results thereof will be described below.

In the experiment, an axial crushing test was performed on a test body imitating the automotive crashworthiness energy absorptive part according to the present invention. In the axial crushing test, a load-stroke curve indicating a relationship between the crashworthiness load and the axial crushing deformation amount (stroke) when the test body length (an axial length $L_0$ of a test body 31) was axially crushed and deformed by 80 mm from 200 mm to 120 mm was measured by inputting the crashworthiness load axially to the test body 31 at a test speed of 17.8 m/s, as illustrated in FIG. 3, and the deformation state was photographed by a high speed camera. Further, absorbing energy at a stroke from 0 to 80 mm was determined from the measured load-stroke curve.

Figure 10:
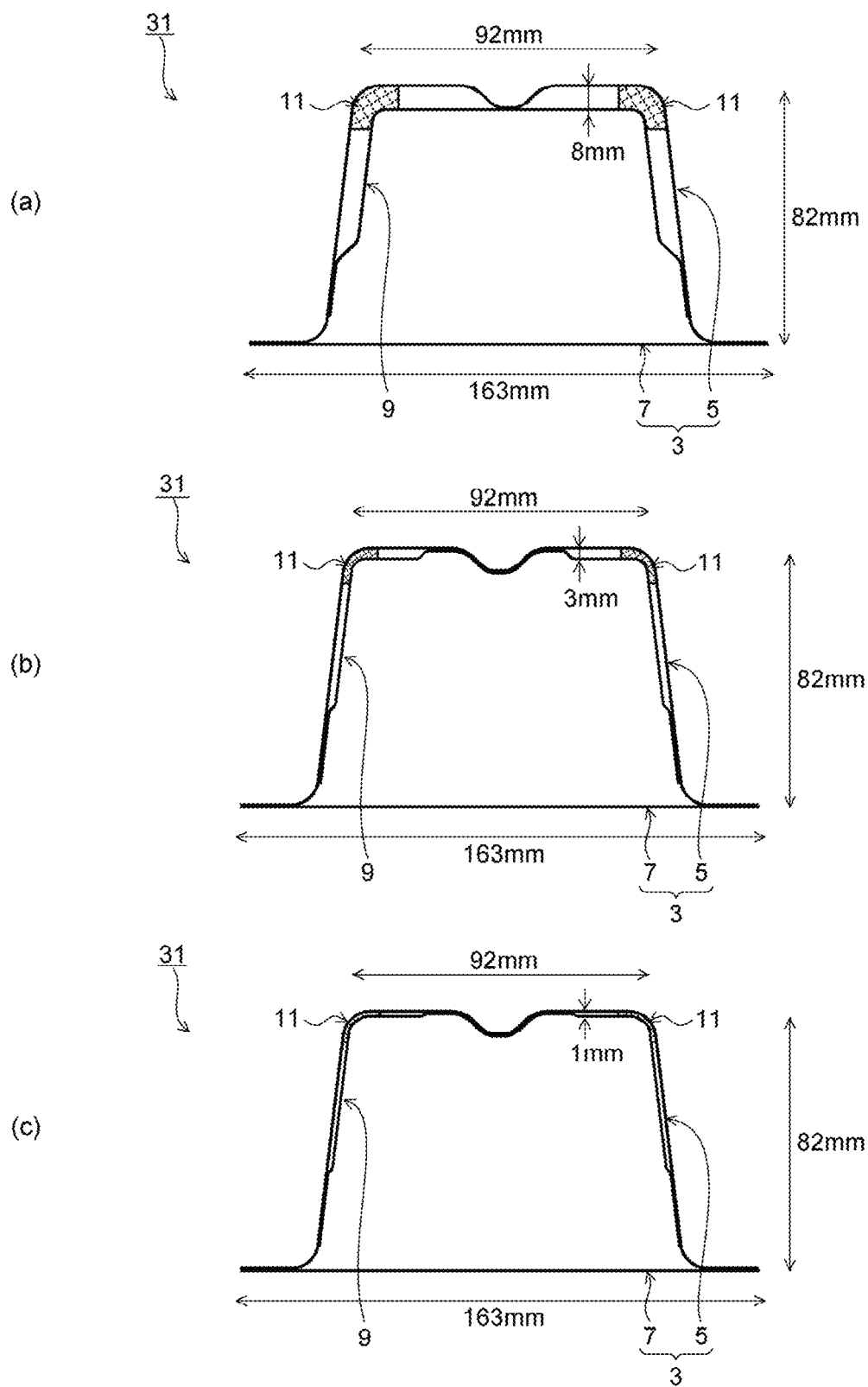
FIG. 10 is a cross-sectional view illustrating a structure of a test body used as an invention example in an axial crushing test in Examples.

FIG. 10 illustrates the structure and shape of the test body 31 used in invention examples. In the invention examples, the axial crushing test was performed using the automotive crashworthiness energy absorptive part 1 (FIGS. 1 and 2) according to the embodiment of the present invention described above as the test body 31.

The test body 31 includes the tubular member 3 in which the outer part 5 and the inner part 7 are joined to each other by spot welding, the closed cross section space is formed between the outer part 5 and the closed cross section space forming wall member 9, and the resin 11 is provided in the respective corner areas on both sides of the top portion in the closed cross section space. The gap heights between the outer part 5 and the closed cross section space forming wall member 9 were set to 8 mm, 3 mm, and 1 mm (FIGS. 10(*a*) to (*c*)).

Steel sheets with tensile strengths of 590 MPa class to 1180 MPa class and a thickness of 1.2 mm or 1.4 mm were used for the outer part 5, and steel sheets with a tensile strength of 590 MPa class and a thickness of 1.2 mm were used for the inner part 7. Steel sheets with a tensile strength of 270 MPa class and a thickness of 0.5 mm were used for the closed cross section space forming wall member 9.

The resin 11 was obtained by heat-treating a rubber-modified epoxy resin and a hardener at a predetermined heating temperature and heating time, and the values of the tensile breaking elongation, adhesive strength, compressive nominal stress of the heat-treated resin 11 were set within the range of the present invention.

The water resistance can be changed by sequentially adjusting monomer components constituting the resin 11, and the tensile breaking elongation and the compressive nominal stress are changed by changing the monomer components. The tensile breaking elongation, adhesive strength, and compressive nominal stress of the resin 11 were determined by separately implementing the following test methods.

<Tensile Breaking Elongation>

The gap between two steel sheets was adjusted to 2 mm, an uncured resin was placed between the steel sheets and thermally cured under the condition of 180° C.×20 minutes retention, and then the steel sheets were peeled off to prepare a flat sheet-like resin with a thickness of 2 mm. Subsequently, the flat sheet-like resin was processed into a dumbbell shape (JIS No. 6 dumbbell) to prepare a test piece, a tensile test was performed at a tensile speed of 2 mm/min until the resin fractures, and the inter-marker elongation at resin fracture was measured. Then, a value obtained by dividing the measured inter-marker elongation at resin fracture by the initial inter-marker distance (=20 mm) was expressed as a percentage, and the result was defined as the tensile breaking elongation.

<Adhesion Shear Strength>

Figure 11:
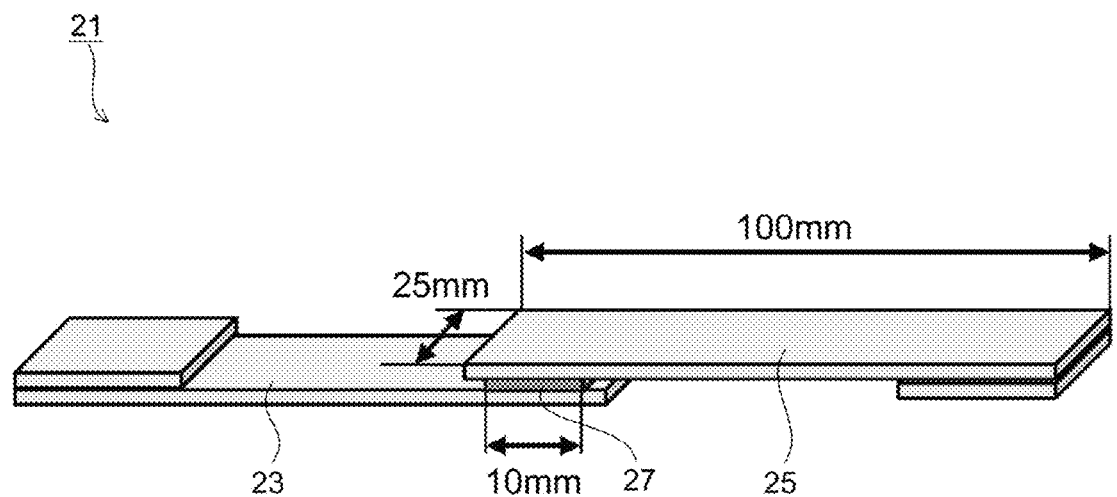
FIG. 11 is a view illustrating a test piece and a test method used for measurement of adhesive strength of a resin and a water resistance evaluation test in Examples.

As illustrated in FIG. 11, an adherend piece 23 and an adherend piece 25 were steel sheets (SPCC) with a width of 25 mm, a thickness of 1.6 mm, and a length of 100 mm, an uncured resin 27 was placed on the adhesion portion (width 25 mm and length 10 mm), and the steel sheets were thermally cured under the condition of retention at 180° C. for 20 minutes in a state in which the thickness was adjusted to 0.15 mm to prepare a test piece 21. Next, a tensile test was performed on the test piece 21 at a tensile speed of 5 mm/minute until the adherend piece 23 or the adherend piece 25 fractured from the resin 27, and the load at fracture was measured. Then, a value obtained by dividing the load at fracture by the area of the adhesion portion (adhesion area: width 25 mm×length 10 mm) was defined as the adhesion shear strength.

<Compressive Nominal Stress>

The gap between two steel sheets was adjusted to 3 mm, an uncured resin was placed between the steel sheets and thermally cured under the condition of 180° C.×20 minutes retention, and then the steel sheets were peeled off to prepare a flat sheet-like resin with a thickness of 3 mm. Then, the flat sheet-like resin was cut into a cylindrical shape with a diameter of 20 mm to obtain a cylindrical resin. Then, using the circular surface of the cylindrical resin with a diameter of 20 mm as a compression surface, a value obtained by dividing a load when the test piece is compressed to a nominal strain of 10% at a test speed of 2 mm/min by the cross-sectional area of the initial cylindrical resin was defined as the compressive nominal stress.

<Water Resistance>

The test piece 21 illustrated in FIG. 11 was immersed in warm water at 70° C. for 72 hours, and then a tensile test was performed on the test piece 21 at a tensile speed of 5 mm/min until the adherend piece 23 or the adherend piece 25 fractured from the resin 27, and the peeling state of the adherend piece 23 or the adherend piece 25 and the resin 27 was observed. The case where the cohesive fracture (where the area ratio of the resin remained on the resin adhesive surfaces of the adherend piece 23 and the adherend piece 25 when fracture occurred was 100%) occurred from inside of the resin 27 was evaluated as no interfacial peeling (o), and the case where interfacial peeling (where the surface of the adherend piece appeared when fracture occurred and the ratio of the resin remaining on the adhesive surfaces of the adherend piece 23 and the adherend piece 25 was less than 100%) occurred between the adherend piece 23 or the adherend piece 25 and the resin 27 was evaluated as ×.

Figure 12:
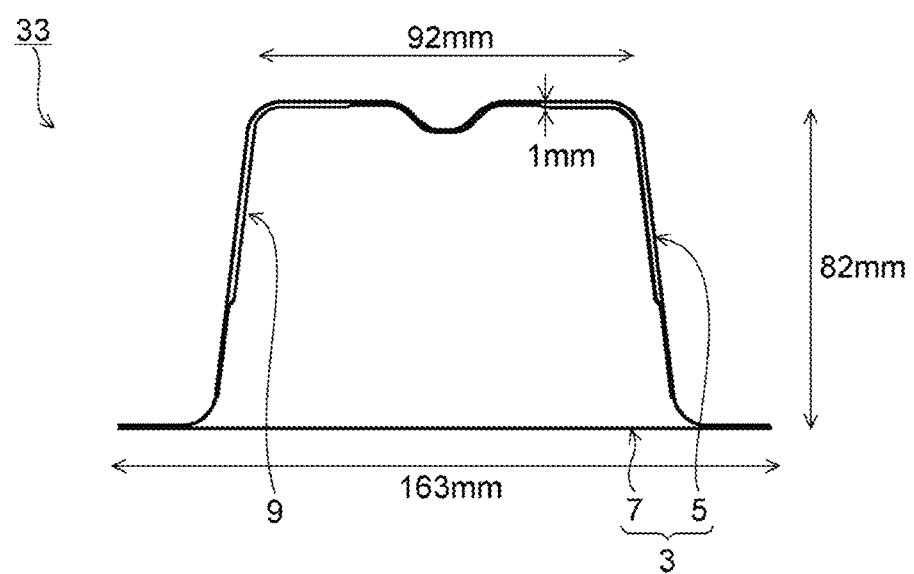
FIG. 12 is a view illustrating a structure of a test body used as a comparison target in the axial crushing test in Examples.

In the present examples, an axial crushing test was performed in the same manner as in the invention examples, by defining as comparative examples cases where a test body 33 (FIG. 12) having the same shape as the tubular member 3 and the closed cross section space forming wall member 9 in the invention examples and not provided with the resin was used as a comparison target, and cases where the physical properties of the resin 11 fell outside the range of the present invention in the test body 31 having the same shape as that in the invention examples. Table 1 illustrates the conditions of the structure of the test body, type of resin, tensile breaking elongation, adhesive strength, and compressive nominal stress at a compressive nominal strain of 10%, which are used in the invention examples and the comparative examples.

TABLE 1

| | Structure | | | | | | Resin | | | |
|---|---|---|---|---|---|---|---|---|---|---|
| | Outer part | | Closed cross section space forming wall member | | Inner part | | | | | Detection of hardener |
| | Material [MPa] | Thickness [mm] | Material [MPa] | Thickness [mm] | Material [MPa] | Thickness [mm] | Provided/ Not provided | Type of resin | Type of hardener | after heat treatment |
| Invention Example 1 | 590 | 1.2 | 270 | 0.5 | 590 | 1.2 | Provided | Rubber-modified epoxy | Aliphatic polyamine | Detected |
| Invention Example 2 | 590 | 1.2 | 270 | 0.5 | 590 | 1.2 | Provided | Rubber-modified epoxy | Aromatic polyamine | Detected |
| Invention Example 3 | 1180 | 1.2 | 270 | 0.5 | 590 | 1.2 | Provided | Rubber-modified epoxy | Dicyandiamide | Detected |
| Invention Example 4 | 590 | 1.2 | 270 | 0.5 | 590 | 1.2 | Provided | Rubber-modified epoxy | Organic acid hydrazine | Detected |
| Invention Example 5 | 590 | 1.2 | 270 | 0.5 | 590 | 1.2 | Provided | Rubber-modified epoxy | Dicyandiamide | Not detected |
| Invention Example 6 | 1180 | 1.2 | 270 | 0.5 | 590 | 1.2 | Provided | Rubber-modified epoxy | Imidazole | Not detected |
| Invention Example 7 | 590 | 1.2 | 270 | 0.5 | 590 | 1.2 | Provided | Rubber-modified epoxy | Aromatic polyamine | Not detected |
| Comparative Example 1 | 590 | 1.2 | 270 | 0.5 | 590 | 1.2 | Not provided | — | — | — |
| Comparative Example 2 | 590 | 1.4 | 270 | 0.5 | 590 | 1.2 | Not provided | — | — | — |
| Comparative Example 3 | 980 | 1.2 | 270 | 0.5 | 590 | 1.2 | Not provided | — | — | — |
| Comparative Example 4 | 1180 | 1.2 | 270 | 0.5 | 590 | 1.2 | Not provided | — | — | — |
| Comparative Example 5 | 590 | 1.2 | 270 | 0.5 | 590 | 1.2 | Provided | Epoxy | — | — |
| Comparative Example 6 | 590 | 1.2 | 270 | 0.5 | 590 | 1.2 | Provided | Urethane | — | — |
| Comparative Example 7 | 590 | 1.2 | 270 | 0.5 | 590 | 1.2 | Provided | Urethane | — | — |

TABLE 1-continued

| | | | | | | | | | | |
|---|---|---|---|---|---|---|---|---|---|---|
| Comparative Example 8 | 590 | 1.2 | 270 | 0.5 | 590 | 1.2 | Provided | Rubber-modified epoxy | Aliphatic polyamine | Detected |
| Comparative Example 9 | 590 | 1.2 | 270 | 0.5 | 590 | 1.2 | Provided | Rubber-modified epoxy | Aromatic polyamine | Detected |
| Comparative Example 10 | 1180 | 1.2 | 270 | 0.5 | 590 | 1.2 | Provided | Rubber-modified epoxy | Dicyandiamide | Detected |
| Comparative Example 11 | 590 | 1.2 | 270 | 0.5 | 590 | 1.2 | Provided | Rubber-modified epoxy | Organic acid hydrazine | Detected |
| Comparative Example 12 | 590 | 1.2 | 270 | 0.5 | 590 | 1.2 | Provided | Rubber-modified epoxy | Dicyandiamide | Not detected |
| Comparative Example 13 | 1180 | 1.2 | 270 | 0.5 | 590 | 1.2 | Provided | Rubber-modified epoxy | Imidazole | Not detected |
| Comparative Example 14 | 590 | 1.2 | 270 | 0.5 | 590 | 1.2 | Provided | Rubber-modified epoxy | Aromatic polyamine | Not detected |

| | Resin | | | | | Absorbing energy test | | |
|---|---|---|---|---|---|---|---|---|
| | Thickness [mm] | Tensile breaking elongation [%] | Adhesive strength [MPa] | Compressive nominal stress [MPa] | Water resistance of resin | speed 17.8 m/s [kJ] | [kJ/kg] | Test body weight [kg] |
| Invention Example 1 | 8 | 3 | 12 | 6 | ○ | 13.8 | 11.1 | 1.24 |
| Invention Example 2 | 1 | 30 | 13 | 8 | ○ | 10.0 | 9.0 | 1.11 |
| Invention Example 3 | 1 | 40 | 14 | 8 | ○ | 12.8 | 11.4 | 1.12 |
| Invention Example 4 | 3 | 75 | 14 | 7 | ○ | 10.5 | 9.0 | 1.17 |
| Invention Example 5 | 8 | 5 | 13 | 6 | ○ | 13.8 | 11.1 | 1.24 |
| Invention Example 6 | 1 | 30 | 14 | 8 | ○ | 12.8 | 11.5 | 1.11 |
| Invention Example 7 | 3 | 60 | 14 | 7 | ○ | 10.4 | 8.9 | 1.17 |
| Comparative Example 1 | — | — | — | — | — | 6.5 | 6.1 | 1.06 |
| Comparative Example 2 | — | — | — | — | — | 7.0 | 6.0 | 1.17 |
| Comparative Example 3 | — | — | — | — | — | 8.1 | 7.6 | 1.06 |
| Comparative Example 4 | — | — | — | — | — | 8.5 | 7.9 | 1.07 |
| Comparative Example 5 | 1 | 2 | 26 | 55 | ○ | 7.4 | 6.7 | 1.10 |
| Comparative Example 6 | 1 | 2 | 10 | 10 | ○ | 7.2 | 6.6 | 1.09 |
| Comparative Example 7 | 1 | 1.5 | 4 | 4 | ○ | 7.0 | 6.5 | 1.08 |
| Comparative Example 8 | 8 | 80 | 12 | 6 | X | 12.8 | 10.3 | 1.24 |
| Comparative Example 9 | 1 | 100 | 13 | 8 | X | 9.6 | 8.6 | 1.11 |
| Comparative Example 10 | 1 | 100 | 14 | 8 | X | 12.3 | 11.0 | 1.12 |
| Comparative Example 11 | 3 | 90 | 14 | 7 | X | 9.9 | 8.5 | 1.17 |
| Comparative Example 12 | 8 | 85 | 13 | 6 | X | 12.8 | 10.3 | 1.24 |
| Comparative Example 13 | 1 | 110 | 14 | 8 | X | 12.3 | 11.1 | 1.11 |
| Comparative Example 14 | 3 | 100 | 14 | 7 | X | 9.9 | 8.5 | 1.17 |

In Invention Examples 1 to 7 in Table 1, the tensile strength (of 590 MPa class to 1180 MPa class) of the steel sheet used for the outer part 5 and the inner part 7 constituting the tubular member 3, the tensile strength (270 MPa class) of the steel sheet used for the closed cross section space forming wall member 9, the type of the resin 11, the tensile breaking elongation, adhesive strength, and compressive nominal stress all fell within the range of the present invention illustrated in the above-described embodiment.

In Invention Examples 1 to 4, the hardener remained in the resin 11 after the heat treatment was performed at a predetermined heating temperature and heating time. In Invention Examples 5 to 7, the amount of the hardener was smaller than those in Invention Examples 1 to 4, and the hardener did not remain or was not detected in the resin 11 after the heat treatment was performed at a predetermined heating temperature and heating time.

On the other hand, in Comparative Examples 1 to 4, the test body 33 not provided with the resin was used. In Comparative Examples 5 to 7, the test body 31 was used in which the type of the resin 11 was epoxy resin or urethane resin, and at least one of the tensile breaking elongation, adhesive strength, and compressive nominal stress fell outside the range of the present invention. In Comparative Examples 8 to 14, the test body 31 having the tensile breaking elongation of the resin 11 of 80% or more was used.

Figure 13:
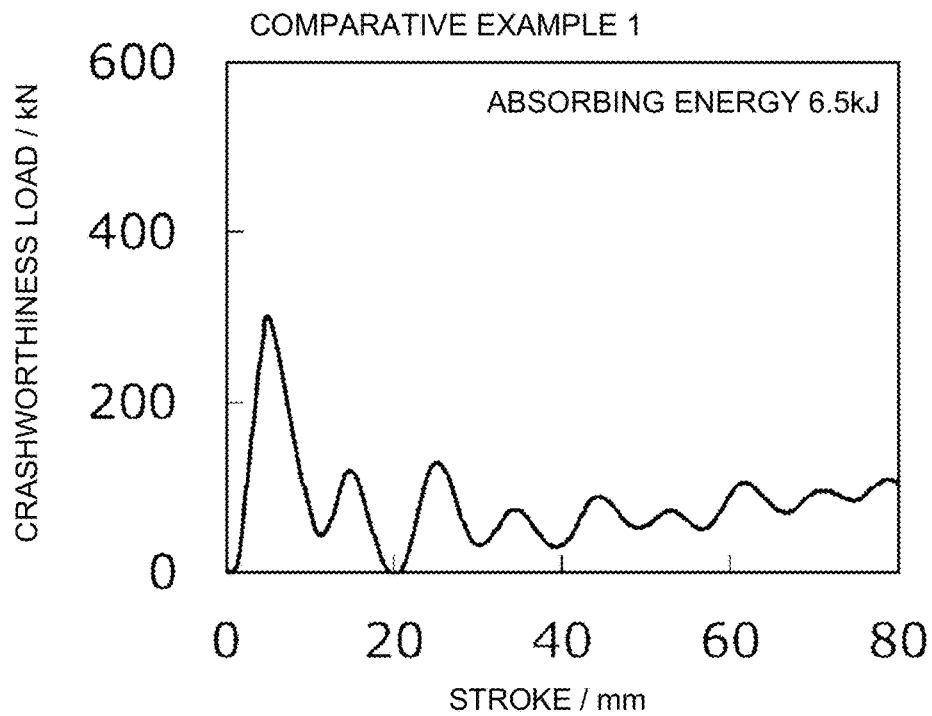
FIG. 13 is a diagram illustrating measurement results of a crashworthiness load and the amount of axial crushing deformation (stroke) when the axial crushing test is performed using the automotive crashworthiness energy absorptive part according to a comparative example as the test body in Examples.
Figure 14:
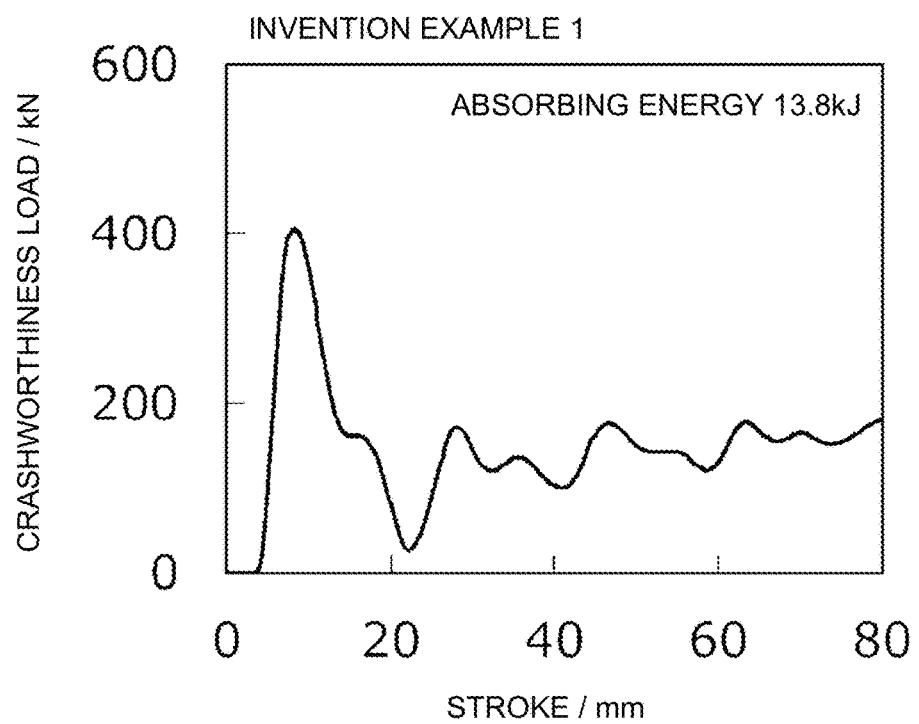
FIG. 14 is a diagram illustrating measurement results of the crashworthiness load and the amount of axial crushing deformation (stroke) when the axial crushing test is performed using the automotive crashworthiness energy absorptive part according to an invention example as the test body in Examples.

FIGS. 13 and 14 illustrate the measurement results of the load-stroke curve when the axial crushing test was performed using the test body 33 according to Comparative Example 1 and the test body 31 (FIG. 10(a)) according to Invention Example 1, respectively. FIGS. 13 and 14 are load-stroke curves having the stroke (mm) representing the deformation amount in the axial direction of the test body from the crash start on the horizontal axis, and the crashworthiness load (kN) input to the test body on the vertical axis. The absorbing energy illustrated in the graph is the amount of crashworthiness energy absorbed at strokes of 0 to 80 mm.

Comparative Example 1 illustrated in FIG. 13 is a result of the test body 33 (FIG. 12) not provided with the resin, and the crashworthiness load input to the test body 33 showed the maximum value (about 300 kN) immediately after the start of input, and thereafter, the value of the crashworthiness load fluctuated with the buckling of the tubular member 3. The absorbing energy at the end of the test when the stroke reached 80 mm was 6.5 kJ.

Invention Example 1 illustrated in FIG. 14 is a result of the test body 31 provided with the resin 11 in the closed cross section space formed between the outer part 5 and the closed cross section space forming wall member 9, and having the tensile breaking elongation (=3%), adhesive strength (=12 MPa), and compressive nominal stress at the compressive nominal strain of 10% (=6 MPa) that all fell within the range of the present invention. From the load-stroke curve illustrated in FIG. 14, the maximum value immediately after the start of input of the crashworthiness load was about 400 kN and was significantly improved as compared with Comparative Example 1 described above. Further, the crashworthiness load after a stroke of 10 mm was higher than that in Comparative Example 1. The absorbing energy at strokes of 0 to 80 mm was also significantly improved to 13.8 kJ as compared with Comparative Example 1.

As described above, it is found in Invention Example 1 that, when the resin 11 is provided between the outer part 5 and the closed cross section space forming wall member 9, and the tensile breaking elongation, adhesive strength, and compressive nominal stress are set within the range of the present invention, the buckling resistance increases in the axial crush process while the deformation resistance increases without peeling of the resin 11, generating bellows-shaped compressive deformation and improving the absorption of crashworthiness energy.

Next, an axial crushing test was performed by changing the structure of the test body used in the axial crushing test, type of the resin, and adhesive strength, and the measurement results of the absorbing energy at strokes of 0 to 80 mm and the test body weight are illustrated in Table 1 described above.

The test body weight in Table 1 is the sum of the weights of the outer part 5, the inner part 7, the closed cross section space forming wall member 9, and the resin 11 in the test body 31 provided with the resin 11. The test body weight is the sum of the weights of the outer part 5, the inner part 7, and the closed cross section space forming wall member 9 in the test body 33 not provided with the resin.

As illustrated in Table 1 described above, the absorbing energy in Invention Example 1 was 13.8 kJ and was significantly improved as compared with the absorbing energy in Comparative Example 1 of 6.5 kJ. Even as compared with the absorbing energy (=8.5 kJ) in Comparative Example 4, which uses a steel sheet (1180 MPa class) with a tensile strength higher than that of Comparative Example 1 for the outer part 5, the absorbing energy was significantly improved in Invention Example 1.

The test body weight in Invention Example 1 was 1.24 kg, which was larger than the test body weight (=1.06 kg) in Comparative Example 1, which was not provided with the resin. However, in Invention Example 1, the absorbing energy per unit weight obtained by dividing the absorbing energy by the test weight was 11.1 kJ/kg, which was higher than that in Comparative Example 1 (=6.1 kJ/kg).

In Invention Example 2, the test body 31 (FIG. 10(c)) was used in which the thickness of the resin 11 was 1 mm, which was smaller than that in Invention Example 1. The absorbing energy in Invention Example 2 was 10.0 kJ and was significantly improved as compared with Comparative Example 1 (=6.5 kJ). The test body weight in Invention Example 2 was 1.11 kg, which was lighter than that in Invention Example 1. The absorbing energy per unit weight in Invention Example 2 was 9.0 kJ/kg and was improved as compared with Comparative Example 1 (=6.1 kJ/kg).

In Invention Example 3, the test body 31 (FIG. 10(c)) was used in which the tensile strength of the steel sheet used for the outer part 5 was 1180 MPa class and the thickness of the resin 11 was 1 mm. The absorbing energy in Invention Example 3 was 12.8 kJ and was significantly improved as compared with Comparative Example 4 (=8.5 kJ), in which a steel sheet with a tensile strength of a 1180 MPa class was used for the outer part 5. The test body weight in Invention Example 3 was 1.12 kg, which was lighter than that in Invention Example 1. Besides, the absorbing energy per unit weight in Invention Example 3 was 11.4 kJ/kg and was improved as compared with Comparative Example 4 (=7.9 kJ/kg).

In Invention Example 4, the test body 31 (FIG. 10(b)) was used in which the tensile strength of the steel sheet used for the outer part 5 was 590 MPa class and the thickness of the resin 11 was 3 mm. The absorbing energy in Invention Example 4 was 10.5 kJ and was significantly improved as compared with Comparative Example 1 (=6.5 kJ). The test body weight in Invention Example 4 was 1.17 kg, which was lighter than that in Invention Example 1. The absorbing energy per unit weight in Invention Example 4 was 9.0 kJ/kg and was improved as compared with Comparative Example 1 (=6.1 kJ/kg).

In Invention Example 5, the test body 31 (FIG. 10(a)) was used in which the tensile strength of the steel sheet used for the outer part 5 was 590 MPa class and the thickness of the resin 11 was 8 mm. The absorbing energy in Invention Example 5 was 13.8 kJ and was significantly improved as compared with the absorbing energy of 6.5 kJ in Comparative Example 1. Even as compared with the absorbing energy (=8.5 kJ) in Comparative Example 4, which used a steel sheet (1180 MPa class) with a tensile strength higher than that of Comparative Example 1 for the outer part 5, the absorbing energy was significantly improved in Invention Example 5. The absorbing energy per unit weight in Invention Example 5 was 11.1 kJ/kg and was significantly improved as compared with Comparative Example 1 (=6.1 kJ/kg).

In Invention Example 6, the test body 31 (FIG. 10(*c*)) was used in which the tensile strength of the steel sheet used for the outer part 5 was 1180 MPa class and the thickness of the resin 11 was 1 mm. The absorbing energy in Invention Example 6 was 12.8 kJ and was significantly improved as compared with Comparative Example 4 (=8.5 kJ). The test body weight in Invention Example 6 was 1.11 kg, which was lighter than that in Invention Example 1. Besides, the absorbing energy per unit weight in Invention Example 6 was 11.5 kJ/kg and was improved as compared with Comparative Example 4 (=7.9 kJ/kg).

In Invention Example 7, the test body 31 (FIG. 10(*b*)) was used in which the tensile strength of the steel sheet used for the outer part 5 was 590 MPa class and the thickness of the resin 11 was 3 mm. The absorbing energy in Invention Example 7 was 10.4 kJ and was significantly improved as compared with Comparative Example 1 (=6.5 kJ). The test body weight in Invention Example 7 was 1.17 kg, which was lighter than that in Invention Example 1. The absorbing energy per unit weight in Invention Example 7 was 8.9 kJ/kg and was improved as compared with Comparative Example 1 (=6.1 kJ/kg).

In Comparative Example 1, the test body 33 (FIG. 12) not provided with the resin was used, and the test body weight was 1.06 kg. As illustrated in FIG. 13 described above, the absorbing energy was 6.5 kJ, and the absorbing energy per unit weight was 6.1 kJ/kg.

In Comparative Example 2, the test body 33 having the same shape as that in Comparative Example 1 and using a steel sheet with a thickness of 1.4 mm for the outer part 5 was used, and the test body weight was 1.17 kg. The absorbing energy in Comparative Example 2 was 7.0 kJ and the absorbing energy per unit weight was 6.0 kJ/kg, and the absorbing energy was larger than that in Comparative Example 1 but fell short of the absorbing energy in Invention Examples 1 to 7.

In Comparative Example 3, the test body 33 having the same shape as that in Comparative Example 1 and using a steel sheet with a tensile thickness of 980 MPa for the outer part 5 was used, and the test body weight was 1.06 kg. The absorbing energy in Comparative Example 3 was 8.1 kJ and the absorbing energy per unit weight was 7.6 kJ/kg, and both the absorbing energy and the absorbing energy per unit weight were larger than those in Comparative Example 1 but fell short of those in Invention Examples 1 to 7.

In Comparative Example 4, the test body 33 having the same shape as that in Comparative Example 1 and using a steel sheet with a tensile thickness of 1180 MPa for the outer part 5 was used, and the test body weight was 1.07 kg. The absorbing energy in Comparative Example 4 was 8.5 kJ and the absorbing energy per unit weight was 7.9 kJ/kg, and both the absorbing energy and the absorbing energy per unit weight were larger than those in Comparative Example 1 but fell short of those in Invention Examples 1 to 7.

In Comparative Example 5, Comparative Example 6, and Comparative Example 7, the test bodies have the same shape as the test body 31 (FIG. 10) according to Invention Example 2, but the type of the resin or at least one of the tensile breaking elongation, adhesive strength, and compressive nominal stress of the resin falls outside the range of the present invention. The absorbing energy and absorbing energy per unit weight in Comparative Example 5, Comparative Example 6 and Comparative Example 7 fell short of those in Invention Examples 1 to 7.

Comparative Example 8 is an example in which the test body has the same shape as the test body 31 according to Invention Example 1 but uses the resin with a tensile breaking elongation of 80%, which is inferior in water resistance evaluation. The test body weight was 1.24 kg, which was larger than the test body weight (=1.06 kg) in Comparative Example 1, which is not provided with the resin. Further, interfacial peeling occurred in the water resistance evaluation. In Invention Example 8, the absorbing energy per unit weight obtained by dividing the absorbing energy (12.8 kJ) by the test weight was 10.3 kJ/kg and fell short of that in Invention Example 1 (=11.1 kJ/kg).

Comparative Example 9 is an example in which the test body has the same shape as the test body 31 according to Invention Example 2 but uses the resin with a tensile breaking elongation of 100%, which is inferior in water resistance evaluation. The test body weight was 1.11 kg, which was lighter than that in Invention Example 1. However, interfacial peeling occurred in the water resistance evaluation. The absorbing energy per unit weight in Comparative Example 9 was 8.6 kJ/kg and fell short of that in Invention Example 2 (=9.0 kJ/kg).

Comparative Example 10 is an example in which the test body has the same shape as the test body 31 according to Invention Example 3 but uses the resin with a tensile breaking elongation of 100%, which is inferior in water resistance evaluation. The test weight was 1.12 kg, which was the same as that in Invention Example 3, but interfacial peeling occurred in the water resistance evaluation. The absorbing energy per unit weight in Comparative Example 10 was 11.0 kJ/kg and fell short of that in Invention Example 3 (=11.4 kJ/kg).

Comparative Example 11 is an example in which the test body has the same shape as the test body 31 according to Invention Example 4 but uses the resin with a tensile breaking elongation of 90%, which is inferior in water resistance evaluation. The test weight was 1.17 kg, which was the same as that in Invention Example 4, but interfacial peeling occurred in the water resistance evaluation. The absorbing energy per unit weight in Comparative Example 11 was 8.5 kJ/kg and fell short of that in Invention Example 4 (=9.0 kJ/kg).

Comparative Example 12 is an example in which the test body has the same shape as the test body 31 according to Invention Example 5 but uses the resin with a tensile breaking elongation of 85%, which is inferior in water resistance evaluation. The test weight was 1.24 kg, which was the same as that in Invention Example 5, but interfacial peeling occurred in the water resistance evaluation. The absorbing energy per unit weight in Comparative Example 12 was 10.3 kJ/kg and fell short of that in Invention Example 5 (=11.1 kJ/kg).

Comparative Example 13 is an example in which the test body has the same shape as the test body 31 according to Invention Example 6 but uses the resin with a tensile breaking elongation of 110%, which is inferior in water resistance evaluation. The test weight was 1.11 kg, which was the same as that in Invention Example 6, but interfacial peeling occurred in the water resistance evaluation. The absorbing energy per unit weight in Comparative Example 13 was 11.1 kJ/kg and fell short of that in Invention Example 6 (=11.5 kJ/kg).

Comparative Example 14 is an example in which the test body has the same shape as the test body 31 according to Invention Example 7 but uses the resin with a tensile breaking elongation of 100%, which is inferior in water resistance evaluation. The test weight was 1.17 kg, which was the same as that in Invention Example 7, but interfacial peeling occurred in the water resistance evaluation. The absorbing energy per unit weight in Comparative Example 14 was 8.5 kJ/kg and fell short of that in Invention Example 7 (=8.9 kJ/kg).

Invention Examples 1 to 7 that applied the resin falling within the range of the present invention had good water resistance, but Comparative Examples 8 to 14 that applied the resin falling outside the range of the present invention had inferior water resistance.

As described above, it has been demonstrated that the automotive crashworthiness energy absorptive part according to the present invention can improve the absorptive properties of crashworthiness energy during axial crush when a crashworthiness load is input in the axial direction, and has excellent water resistance.

INDUSTRIAL APPLICABILITY

According to the present invention, it is possible to provide an automotive crashworthiness energy absorptive part capable of improving the crashworthiness energy absorbing effect while the automotive crashworthiness energy absorptive part axially crushes in a bellows-shaped manner when a crashworthiness load is input from the front or the rear of the automotive body such as the front side member or crash box, and capable of ensuring water resistance and thereby stably maintaining an excellent crashworthiness energy absorbing effect without change even when used for a long period of time in the use environment of an actual vehicle such as rainy weather or high humidity.

REFERENCE SIGNS LIST

1 AUTOMOTIVE CRASHWORTHINESS ENERGY ABSORPTIVE PART
3 TUBULAR MEMBER
5 OUTER PART
5a TOP PORTION
5b CORNER PORTION
5c SIDE WALL PORTION
5d FLANGE PORTION
5e BOUNDARY BETWEEN CURVE AND STRAIGHT LINE
7 INNER PART
7a TOP PORTION
7b CORNER PORTION
7c SIDE WALL PORTION
9 CLOSED CROSS SECTION SPACE FORMING WALL MEMBER
9a SIDE WALL PORTION
9b BOUNDARY BETWEEN CURVE AND STRAIGHT LINE
11 RESIN
13 JOIN PORTION
15 JOIN PORTION
17 CAVITY
19 CORNER AREA
21 TEST PIECE
23 ADHEREND PIECE
25 ADHEREND PIECE
27 RESIN
31 TEST BODY
33 TEST BODY

The invention claimed is:

1. An automotive crashworthiness energy absorptive part for absorbing crashworthiness energy by crushing axially when a crashworthiness load is input from a front side or a rear side of an automotive body, the automotive crashworthiness energy absorptive part comprising:
  a tubular member formed of a steel sheet with a tensile strength of 590 MPa to 1180 MPa, the tubular member including a top portion and a pair of side wall portions continuous from both ends of the top portion via corner portions;
  a closed cross section space forming wall member formed of a steel sheet with a tensile strength lower than that of the tubular member, the closed cross section space forming wall member being disposed on an inner surface side of the tubular member and forming a closed cross section space between the closed cross section space forming wall member and at least the corner portion; and
  a resin provided in the closed cross section space,
  wherein the resin contains a rubber-modified epoxy resin and a hardener, and has a tensile breaking elongation of 2% or more and less than 80%, an adhesive strength with the tubular member and the closed cross section space forming wall member of 12 MPa or more, and a compressive nominal stress of 6 MPa or more at a compressive nominal strain of 10%.

2. The automotive crashworthiness energy absorptive part according to claim 1, wherein the closed cross section space forming wall member is disposed so as to straddle the top portion and the corner portion, and has both end portions joined to inner surfaces of the pair of side wall portions and a central portion in contact with the inner surface of the top portion.

3. The automotive crashworthiness energy absorptive part according to claim 2, wherein the central portion of the closed cross section space forming wall member is joined to the inner surface of the top portion.

4. The automotive crashworthiness energy absorptive part according to claim 1, wherein the closed cross section space forming wall member is disposed so as to straddle the corner portion, and has one end portion joined to the inner surface of the side wall portion continuous from the corner portion and the other end joined to the inner surface of the top portion continuous from the corner portion.

5. The automotive crashworthiness energy absorptive part according to claim 1, wherein the resin is provided in at least a corner area in the closed cross section space, and at least one of areas on both sides of the resin in the closed cross section space is a cavity.

6. An automotive crashworthiness energy absorptive part for absorbing crashworthiness energy by crushing axially when a crashworthiness load is input from a front side or a rear side of an automotive body, the automotive crashworthiness energy absorptive part comprising:
  a tubular member formed of a steel sheet with a tensile strength of 590 MPa to 1180 MPa, the tubular member including a top portion and a pair of side wall portions continuous from both ends of the top portion via corner portions;

a closed cross section space forming wall member formed of a steel sheet with a tensile strength lower than that of the tubular member, the closed cross section space forming wall member being disposed on an inner surface side of the tubular member and forming a closed cross section space between the closed cross section space forming wall member and at least the corner portion; and a resin provided in the closed cross section space, wherein the resin contains a rubber-modified epoxy resin, and has a tensile breaking elongation of 2% or more and less than 80%, an adhesive strength with the tubular member and the closed cross section space forming wall member of 12 MPa or more, and a compressive nominal stress of 6 MPa or more at a compressive nominal strain of 10%.

7. The automotive crashworthiness energy absorptive part according to claim 6, wherein the closed cross section space forming wall member is disposed so as to straddle the top portion and the corner portion, and has both end portions joined to inner surfaces of the pair of side wall portions and a central portion in contact with the inner surface of the top portion.

8. The automotive crashworthiness energy absorptive part according to claim 7, wherein the central portion of the closed cross section space forming wall member is joined to the inner surface of the top portion.

9. The automotive crashworthiness energy absorptive part according to claim 6, wherein the closed cross section space forming wall member is disposed so as to straddle the corner portion, and has one end portion joined to the inner surface of the side wall portion continuous from the corner portion and the other end joined to the inner surface of the top portion continuous from the corner portion.

10. The automotive crashworthiness energy absorptive part according to claim 6, wherein the resin is provided in at least a corner area in the closed cross section space, and at least one of areas on both sides of the resin in the closed cross section space is a cavity.

* * * * *